(12) United States Patent
Cohen et al.

(10) Patent No.: US 12,088,540 B2
(45) Date of Patent: Sep. 10, 2024

(54) ENABLING SMART COMMUNICATION NETWORKS USING ASSET INFORMATION IN A SUPPLY CHAIN ENVIRONMENT

(71) Applicant: Cox Communications, Inc., Atlanta, GA (US)

(72) Inventors: Alexis Cohen, Atlanta, GA (US); Jacob Mapel, Atlanta, GA (US); Hunter Shinn, Atlanta, GA (US); Zach Ritter, Atlanta, GA (US); David Lee, Atlanta, GA (US); Amanda Marotti, Atlanta, GA (US); Barbara Hernandez, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 17/809,863

(22) Filed: Jun. 29, 2022

(65) Prior Publication Data

US 2024/0007423 A1    Jan. 4, 2024

(51) Int. Cl.
*H04L 51/04* (2022.01)
*G06F 11/34* (2006.01)
*G06N 20/00* (2019.01)
*H04L 67/306* (2022.01)

(52) U.S. Cl.
CPC .......... *H04L 51/04* (2013.01); *G06F 11/3438* (2013.01); *G06N 20/00* (2019.01); *H04L 67/306* (2013.01)

(58) Field of Classification Search
CPC ...................................................... G06N 20/00
See application file for complete search history.

(56) References Cited

U.S. PATENT DOCUMENTS

| | | | | |
|---|---|---|---|---|
| 2006/0143034 A1* | 6/2006 | Rothermel | ............. | G06Q 10/10 705/301 |
| 2010/0058201 A1* | 3/2010 | Harvey | ............. | G06Q 10/10 715/753 |
| 2013/0222133 A1* | 8/2013 | Schultz | ............. | G08B 25/08 340/539.11 |
| 2015/0046361 A1* | 2/2015 | Williams | ............. | G06Q 10/083 705/330 |
| 2015/0046363 A1* | 2/2015 | McNamara | ........ | G06Q 10/0833 705/333 |
| 2015/0261769 A1* | 9/2015 | Ono | ............. | G06F 16/9537 707/724 |
| 2018/0053401 A1* | 2/2018 | Martin | ............. | H04M 11/04 |
| 2018/0215039 A1* | 8/2018 | Sinyavskiy | ......... | A47L 11/4011 |
| 2018/0308569 A1* | 10/2018 | Luellen | ............. | G16H 20/10 |
| 2018/0325470 A1* | 11/2018 | Fountaine | ............. | G08B 21/0469 |

(Continued)

*Primary Examiner* — Chris Parry
*Assistant Examiner* — Abderrahmen Chouat
(74) *Attorney, Agent, or Firm* — Eversheds Sutherland (US) LLP

(57) ABSTRACT

This disclosure describes systems, methods, and devices related to providing smart communication networks using asset information in a supply chain environment. Techniques described herein may relate to collecting real-time asset tracking data for an asset, detecting an event associated with the asset, identifying two or more users to add to a smart communications groups based on historical user interactions and historical tracking data, and creating an asset-centric smart communications groups with the identified two or more users.

20 Claims, 8 Drawing Sheets

(56) References Cited

U.S. PATENT DOCUMENTS

| 2023/0246924 A1* | 8/2023 | Paul | G06F 3/0482 |
| | | | 715/753 |
| 2023/0276207 A1* | 8/2023 | Sood | H04W 4/029 |
| | | | 455/67.11 |

* cited by examiner

ENABLING SMART COMMUNICATION NETWORKS USING ASSET INFORMATION IN A SUPPLY CHAIN ENVIRONMENT

TECHNICAL FIELD

This disclosure generally relates to systems and methods for smart communication networks using asset information, their environmental conditions, and their locations in a supply chain. Techniques described herein may be used to streamline communication amongst individuals in the dataset of whom it is most important to notify when a disruption to the supply chain occurs.

BACKGROUND

In the context of supply chain management, there are many challenges involved in the successful delivery of assets. Many different parties may be involved in a supply chain, and when a breakdown in the supply chain occurs, communications are often disseminated in a sub-optimal manner where a "game of telephone" is often involved where a party seeking information regarding the asset may contact a first entity, the first entity contacts a second entity, and so forth, until an entity having the information being sought is found. This results in inefficient communications that unnecessarily involve many parties that may not be able to make any direct, meaningful contribution to the information being sought. Communications within a supply chain environment can be improved.

Figure 1:
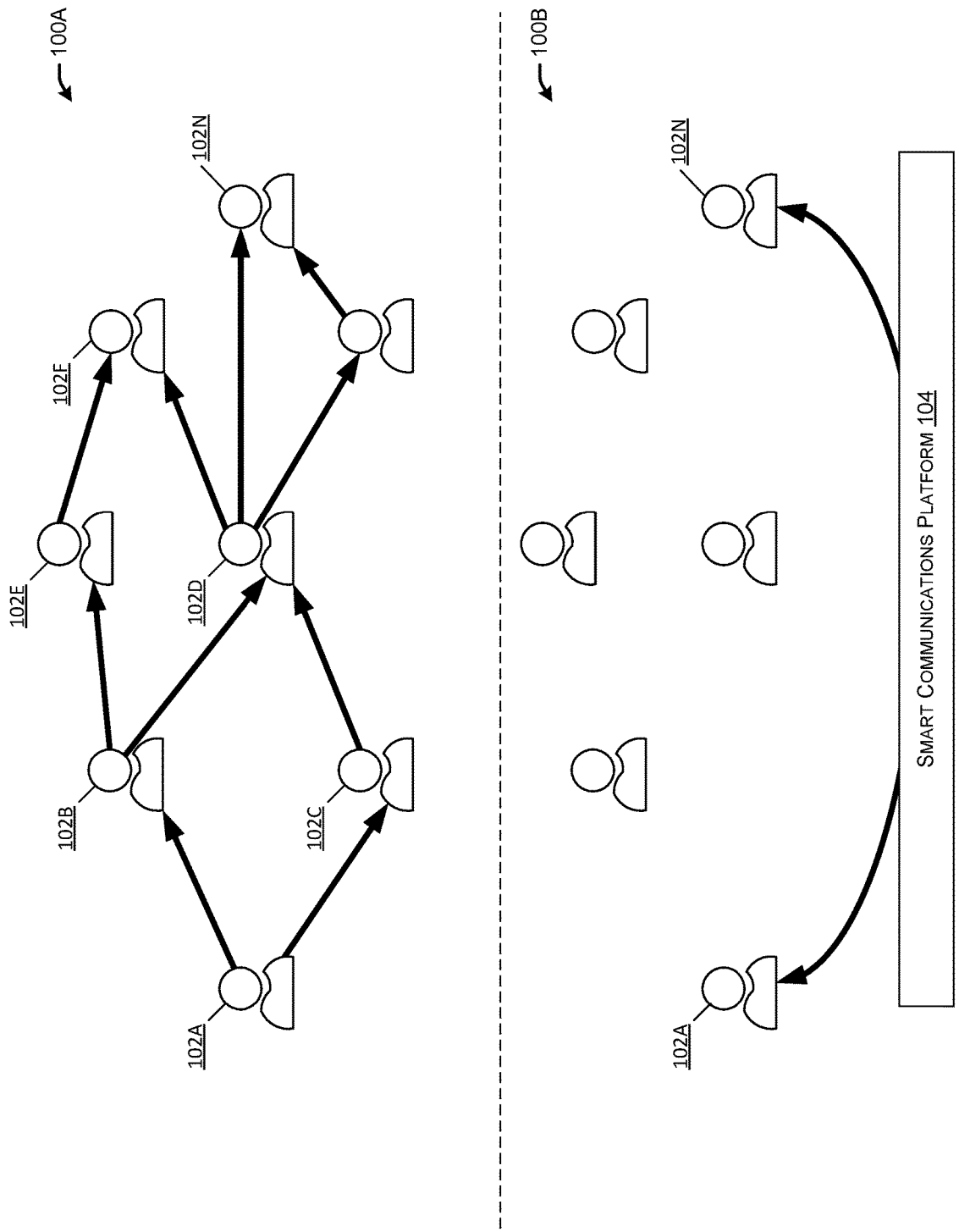
FIG. 1 illustrates an example environment for implementing techniques to enable smart communications networks using asset information in a supply chain environment, in accordance with one or more embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

There are many challenging problems within the context of supply chain management and successful management of assets as they make their way through a supply chain. Spoilage, loss, theft, and on-time delivery are just a few illustrative examples of expensive problems that organizations may encounter in real-world supply chains. Techniques described herein may be used to reduce these problems by providing real-time asset intervention that analyzes the risk of various failures and determining appropriate interventions for the specific environment of an asset in the supply chain. In at least one embodiment, event data for assets that make their way through a supply chain are recorded to a database. This database may serve as a corpus of training data for a prediction model that can be used to predict or infer the probability of failure for subsequent assets making their way through the supply chain. The event data collected may include sensor data from an asset tracking device that is attacked to the package, external data such as weather, traffic data, or presence data. A prediction model may be trained to determine the probability of various modes of failure, such as spoilage, loss, theft, and on-time delivery, which should be construed merely as illustrative examples that do not limit the scope of the disclosure. Once a prediction model is trained on historical package data, it may be used to monitor the status of packages and assets in real-time.

Generally speaking, a desired goal in a supply chain involves the shipment of an asset or package through a supply chain, which may involve the movement of the asset through various locations and/or through various parties. In a supply chain, there may be various parties that are involved in the handling of an asset or package, and not all parties may have real-time visibility into the status of the asset or package.

In the context of supply chain management, there are many challenges involved in the successful delivery of assets. Many different parties may be involved in a supply chain, and when a breakdown in the supply chain occurs, communications are often disseminated in a sub-optimal manner where a "game of telephone" is often involved where a party seeking information regarding the asset may contact a first entity, the first entity contacts a second entity, and so forth, until an entity having the information being sought is found. This results in inefficient communications that unnecessarily involve many parties that may not be able to make any direct, meaningful contribution to the information being sought. Communications within a supply chain environment can be improved.

Techniques described here may be implemented to improve communication events through a supply chain and may serve to reduce or eliminate the "game of telephone"

that ensues when a party seeking information regarding an asset is not aware of whom to contact. In such scenarios, the seeking party may not know who to contact, and either contact too many individuals (resulting in bulk communications that unnecessarily involve individuals that are not able to provide any direct guidance) or requires more time for the seeking party to identify the specific parties that would be able to provide the information being sought. There is no central record to triage the problem. In various embodiments described herein, a communications system is integrated with an intelligence unit to solve the communications problem by pinpointing the most relevant individuals, creating unique communication groups, and streamlining the communication specifically to them. Communication groups may be determined based on the historical actions and behaviors of users of the data set. The communication would then be recorded as evidence of resolution, and may be used to refine the model, which may be implemented as a machine-learning model that uses the successful resolution of issues as a form of reinforced learning.

FIG. 1 illustrates an example environment for implementing techniques to enable smart communications networks using asset information in a supply chain environment, in accordance with one or more embodiments of the present disclosure.

FIG. 1 illustrates a first environment 100A in which multiple connections may be made to facilitate communications between various users or entities in an environment. In the context of a supply chain environment, user 102A may refer to a user or a computing entity (e.g., computing hardware and/or software) being utilized by the user. In various embodiments, user 102A wishes to discover information about an asset within the context of a supply chain environment. The user 102A may be expecting the asset to arrive at a particular location, or may wish to better understand the circumstances around an asset. For example, if an asset is subject to an adverse event, user 102A may wish to learn more about the event or the status of the asset, and so forth. If the information being sought by user 102A is not readily available in a connected computer system, user 102A may engage in a "game of telephone" in which user 102A contacts user 102B and user 102C inquiring on an information-needing event. In many cases, user 102B and 102C may not be the right people to contact, and they may, in turn, reach out to additional users. User 102B may communicate (e.g., make a telephone call) to other users such as 102D and 102E, and user 102C may duplicate efforts and also reach out to user 102D if user 102C is unaware of the communications that 102B is engaging in.

Through this chain of communications, user 102A may be entirely or partially unaware of the communications that are occurring and whether downstream users are contacting the appropriate individuals to seek a resolution or further information regarding an event. For example, user 102F may be contacted by user 102E but not make further communications to either find or resolve the information-needing event. In various cases, after several rounds of communications, eventually an appropriate user—denoted as user 102N—is contacted and user 102N may reply to user 102D, who in turn replies to user 102B and/or user 102C to establish a line of communications between user 102A and 102N. User 102A and user 102N may then engage in a communications group to determine additional information about an asset and/or event surrounding an asset, such as an adverse event that should be resolved.

FIG. 1 illustrates a second environment 100B in which a smart communications platform 104 may be used to establish a smart communications group between user 102A and user 102N without the "game of telephone" depicted in environment 100A. In various embodiments, an information-needing event is detected and an intelligence engine determines that user 102A and user 102N should be included in a communications group for resolution of such an event. The grouping of user 102A and user 102N may involve historical user interactions surrounding historical assets that experienced similar conditions. The intelligence engine may be capable of determining that when certain types of assets are in a certain condition or state, that user 102A is typically interested in such assets and that user 102N is a party that is a relevant party that is in a position to resolve adverse conditions in association with such assets. In this way, the "game of telephone" depicted in environment 100A can be avoided, which reduces the amount of time for user 102A to identify an appropriate target user to communicate with, user 102N, and also reduces the amount of communications clutter involved in linking user 102A with user 102N.

Figure 2:
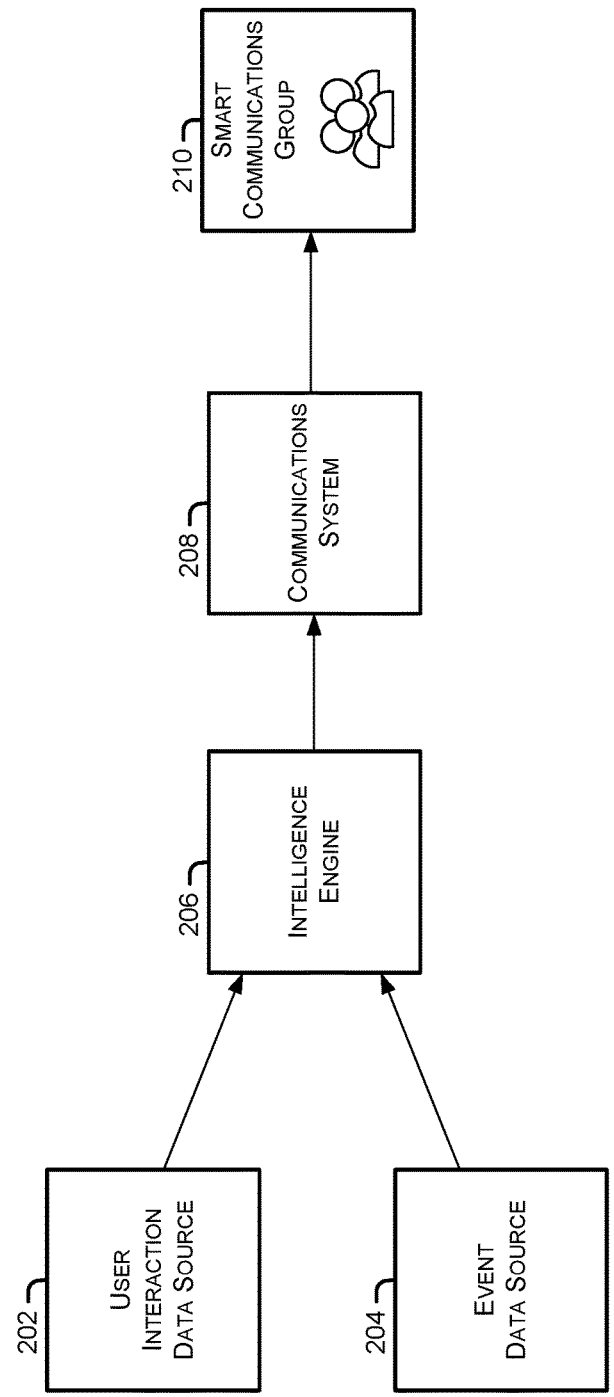
FIG. 2 illustrates an example environment in which smart communications groups may be established via an intelligence engine and through the use of user interaction data and event data, in accordance with one or more embodiments of the present disclosure.

FIG. 2 illustrates an example environment 200 in which smart communications groups may be established via an intelligence engine and through the use of user interaction data and event data, in accordance with one or more embodiments of the present disclosure.

User interaction data source 202 may refer to a database or data store in which user interaction data is collected. Examples of user interaction data include when users follow an asset's status feed in a mobile application, when a user creates or manually joins a communications group associated with an asset, leaves a communications group associated with an asset, performs real-world actions related to an asset, such as physically inspecting an asset, searching for an asset, moving an asset, and so forth.

Event data source 204 may refer to a database or data store in which event data is collected. Event data may be collected from tracking devices attached to assets. Tracking devices may include sensors for measuring the state of a package, including but not limited to GPS sensors, shock sensors, temperature sensors, clocks, timers, and so forth. In various embodiments, tracking devices are used to continuously collect sensor data for an asset in real-time, which is relayed over a wireless communications network to a data ingestion engine which processes and stores data emitted by a tracking device into event data source 204.

Intelligence engine 206 may be generated using user interaction data source 202 and event data source 204. In various embodiments, intelligence engine 206 comprises a model, which may be implemented using artificial intelligence (AI) and machine-learning (ML) models that are trained on data sources to predict whether various users or types of users are likely to perform various types of user interactions based on various asset states. In at least one embodiment, historical user interaction data for a user is used collected to determine the types of asset-related events that a user is likely to subscribe to other otherwise interact with. The intelligence engine 206 may be used to identify, in real-time, an ongoing event and determine whether a user is likely to subscribe to or otherwise interact with the ongoing event based on the user's interaction history with historical assets that were similar to the asset associated with the ongoing event.

In various embodiments, intelligence engine 206 can be used to provide a communications system 208 with target users and/or modes of communication. The communications system 208 may be used to establish a smart communications group 210 around an asset. The smart communications group 210 may be automatically created by communications system 208 in response to an event, or may be initiated by a user that is interested in a particular asset. In various embodiments, an information-needing event associated with an asset is detected and intelligence engine 206 determines a group of users that are likely to be interested in the event based on their interaction histories with historical assets that are similar to the asset in question.

Communications system 208 may be used to allow users to interact with other users that touch or otherwise interact with an asset of interest in a seamless manner. An asset-based communication group may be established through a mobile application as a chat group, information feed associated with the asset, or an email address. For example, an email address may be created for an asset—for example, using a unique identifier associated with the asset—and emails sent to the email address for the asset may be received by the smart communications group 210 and all responses to the email may be received by the participants of the smart communications group 210.

In various embodiments, an application (e.g., mobile application) may be used to implement smart communications group 210 for some or all users. The application may allow for users to see an information feed regarding a specific asset, such as where the asset is, whether it is in transit or not, when it is expected to arrive at a specific location, whether it has been subject to an adverse event such as a delayed delivery and so forth. Users may have the ability to follow the information feed for an asset. This may be considered a type of user interaction that may be used by intelligence engine 206 to determine the types of assets and/or events that a user is interested in. In some embodiments, communications groups are established based on how users follow assets.

In various embodiments, different modes of communication may be facilitated through communications system 208. For example, a user could use a smart communications platform to tag N people in the platform and their respective communication preferences can let the users each digest communication messages in whatever format they wanted. Instead of everyone going back to the application or platform to see asset-related updated, users can express their communication preference as being through the app platform, through email, and so forth, and messages may be sent to users via their preferred platform. For example, if a user selects email as the preferred mode of communication, messages may be sent to the user's email as well as items captured in the feed associated with the asset thread, and dispersed through to everyone else via their preferred mode of communication.

Figure 3:
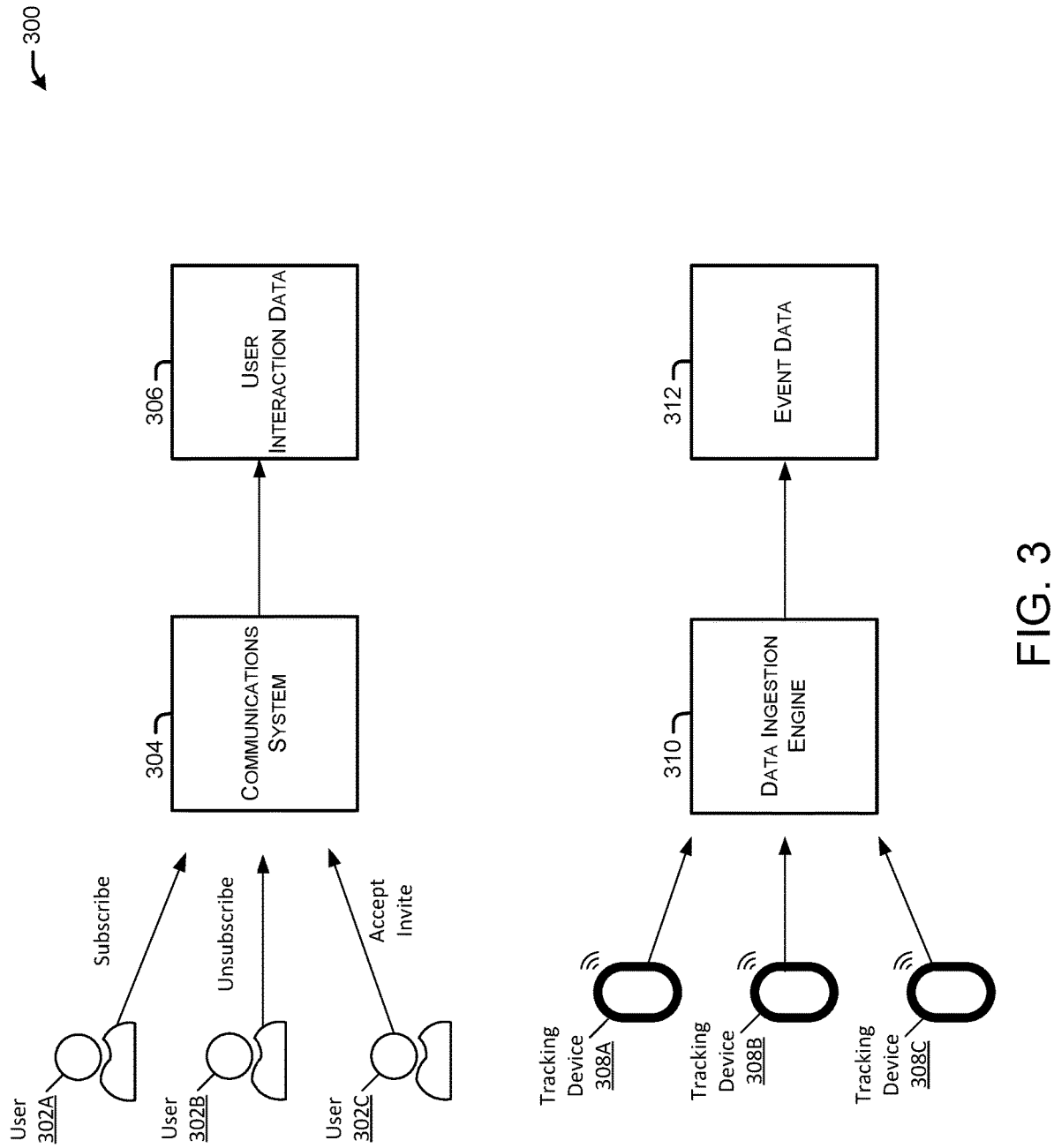
FIG. 3 illustrates an example environment in which data sources for an intelligence engine are collected, in accordance with one or more embodiments of the present disclosure.

FIG. 3 illustrates an example environment 300 in which data sources for an intelligence engine are collected, in accordance with one or more embodiments of the present disclosure.

In various embodiments, there are two different types of signals that are collected in the context of an intelligence engine for managing smart communications group. A first type of signal may refer to signals regarding how users behave, and a second type of signal may refer to data collected from devices.

In various embodiments, user interaction data is collected by messages and other forms of user interaction between users and a communications system or platform. For example, user 302A, user 302B, and user 302C depicted in FIG. 3 may refer to different users of a communications platform. Users may have the ability to interact with different assets that are being tracked through a supply chain environment, such as the location of an asset, who last had custody of an asset, when an asset has been delivered to a location, and so forth. Users may interact via communications system 304, and user interaction data 306 of how various users interact with assets may be recorded to a data store. User interaction data 306 may refer to data collected responsive to user interactions. For example, user 302A may subscribe to notifications for events at a first time. The time and interaction information may be recorded as user interaction data. As a second example, user 302B may leave a communications group or unsubscribe from notifications for an asset that user 302B is not interested in at a second time. This may be due to an intelligence engine predicting incorrectly that user 302B should be included in a smart communications group or subscribed to a feed for a specific asset in response to an event. User 302 manually unsubscribing from a group or feed may be recorded as user interaction data and may furthermore be used to refine intelligence engine predictions to better predict the types of assets that user 302B would like to be subscribed to. User 302C may accept an invite to join a group at a third time. The invitation may be sent to the user manually, for example, by another user such as user 302A that believes user 302C should be included in a communications group. In some embodiments, an intelligence engine has the ability to automatically add a user to a group or recommend a smart communications group to a user. If user 302C accepts the recommendation, the user may receive subsequent notifications and communications related to the asset that is the focus of the smart communications group. The user's acceptance of an invitation and subsequent participation in an asset-centric communications group may be yet another form of user interaction data that is collected by a smart communications platform.

Various types of user interaction data beyond those depicted in FIG. 3 may be collected. For example, how long the user spends interacting with an asset's feed on an application or web site may be indicative of interest or lack thereof relating to that asset. In some embodiments, the user may be interested in assets only when certain conditions occur or based on geolocation. For example, a manager of multiple warehouses may use asset feeds to more closely track assets at warehouses remote from the manager, to ensure that each of the multiple warehouses are operating properly. In various embodiments, users have the option to mute, hide, or snooze a conversation, which may be recorded as user interaction data. In general, any suitable type of manual opt-in or opt-out signal from a user can be used to train an intelligence engine to make better inferences as to the types of smart communications groups that a user should be added or invited to.

Tracking device 308A, 308B, and 308C may refer to different types of tracking devices that may be attached to different assets (or in some cases, the same asset) and may provide tracking data signals to a data ingestion engine 310. In various embodiments, the tracking devices provide sensor data such as geolocation data, shock data, temperature data, clock data, accelerometer data, and so forth. The data may be transmitted wirelessly from a remote location of the package to a data center or server in which data ingestion engine 310 processes the sensor data and saves it as event data 312. Event data may be used to identify information-needing events. For example, if a given asset has temperature specification that indicates it should be within a specific temperature range, an information-needing event may include temperature excursions that are measured by a tracking device that indicates the asset is outside of the specified temperature range for the asset or that the temperature is expected to be outside of the specified temperature range if no further action is taken.

In various embodiments, a prediction model (e.g., machine-learning model) is trained based on user interaction data 306 and event data 312. The co-occurrence of user interaction data and event data may indicate that a particular type of event is relevant to a user. In various embodiments, the co-occurrence of user interaction data and event data are used to determine how to establish smart communications groups. Based on historical knowledge of past user behavior, it can be determined that certain users, for example, users A, B, and C are part of a group when a particular type of event has occurred in the past, and when a similar type of event occurs in real-time, a smart communications group with those users may be formed. Heuristics, machine-learning, or other suitable techniques may be used to identify statistically significant relationships between occurrences of certain types of events with certain types of user interactions, certain types of assets with certain types of user interactions, and so forth. In general, state information associated with an asset (e.g., including the type of asset, sensor data indicating the state of the asset, and so forth) may be used to identify users, predict the types of user interactions or communications that are likely to occur, and so forth.

By collecting information regarding how users communicate with each other, review and interact with assets, an intelligence engine may infer that these types of assets and asset-related events are relevant to a user. Furthermore, other users may be identified with the same or similar relevance criteria, and these users may be identified as target users and may be automatically added and/or invited to a smart communications group in response to future asset-related events that are relevant.

Figure 4:
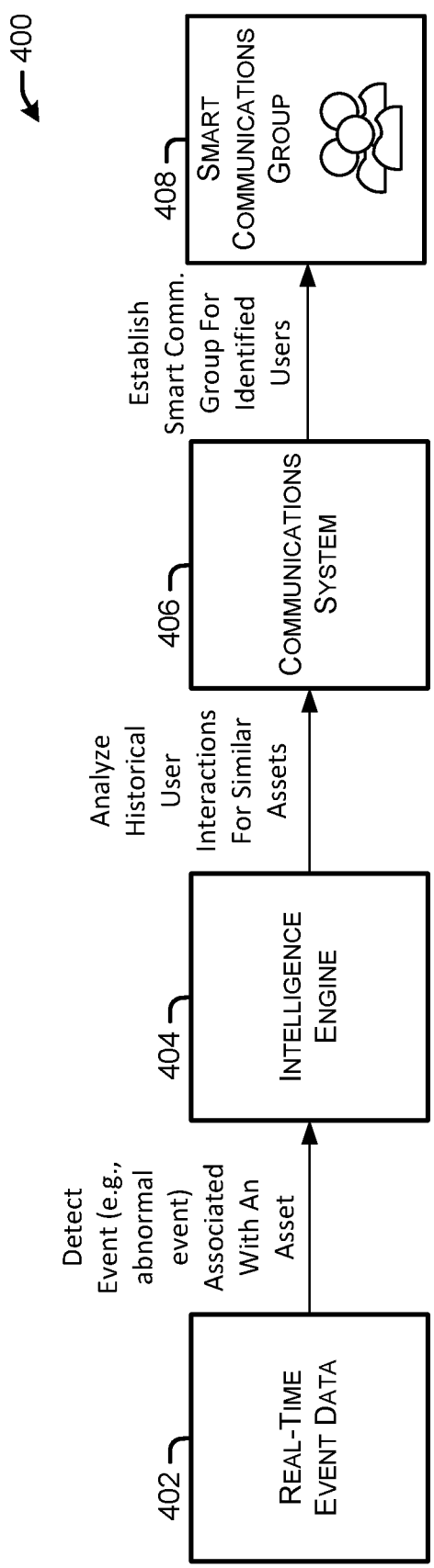
FIG. 4 illustrates an example environment in which a smart communications group is established in real-time, in accordance with one or more embodiments of the present disclosure.

FIG. 4 illustrates an example environment 400 in which a smart communications group is established in real-time, in accordance with one or more embodiments of the present disclosure.

In various embodiments, real-time event data 402 is collected for an asset. The event data may refer to sensor data, for example, that is collected in association with an asset in a supply chain environment. Sensor data collected by a tracking device may include geolocation data, temperature data, shock data, accelerometer data, time and clock data, and so forth. Timestamps may be saved in association with event data as it is collected to provide for trends over time.

Real-time event data may be transmitted wirelessly from a tracking device to a data ingestion service that receives, processes, and stores the tracking data, for example in a database where tracking data is aggregated across multiple tracking devices for multiple assets in a supply chain environment. Real-time event data may be analyzed to detect when an information-needing event occurs for an asset. An information-needing event may refer to an abnormal event that occurs, such as a temperature excursion for a temperature-sensitive asset, such as medical supplies, produce, and so forth. In some cases, information-needing events are not abnormal or unexpected events, but rather expected events. In some embodiments, an information-needing event may occur when, for example, custody of an asset is handed off from one party to another. For example, a first organization may be tasked with delivering an asset to a second organization at a location and an information-needing event may occur to notify an agent of the second organization to receive custody of the asset when it arrives.

Intelligence engine 404 may comprise a machine-learning (ML) model that analyzes historical user interactions for historical assets that have moved through a supply chain that are similar to the asset that is being monitored in real-time. For example, similarities may include the size, value, or type of payload included in the asset. Similarities may include locations or paths being taken by assets through a supply chain. Similarities may include types of adverse conditions that may occur, such as temperature excursions for temperature-sensitive assets. When similar conditions are detected, an intelligence engine may determine target users that may be interested in being notified of the information-needing event associated with the asset in real-time. Historical user interaction data may be used to determine specific users or types of users that should be identified as target users for a smart communications group. For example, if hypothetical users A, B, and C have subscribed to notifications for previous similar assets under similar conditions, then intelligence engine 404 may infer that those users should be grouped together when a real-time event signal indicates that a similar asset is presently experiencing similar conditions. Intelligence engine 404 may identify a set of target users based on their historical user interactions with similar assets, and provide the users to communications system 406.

In various embodiments, communications system 406 receives a list of target users from intelligence engine 404. The intelligence engine 404 may provide other information, such as an asset identifier associated with an adverse event, event data (e.g., abnormal event) that is indicative of the need to create a smart communications group, and so forth. Communications system 406 may establish a smart communications group 408 and either add or invite the target users to smart communications group 408. In various embodiments, users receive notifications on a smart communications platform that an event that may be relevant to them has been detected and that they have been included into a smart communications group 408 along with other users for whom the event is relevant. The group of users may communicate with each other, add additional users, or perform other user interactions. The communications may involve determining additional information regarding the event, coordinating the performance of appropriate actions in relation to an adverse event, and so forth.

Users may be selectively targeted for inclusion in smart communications group 408. The smart communications group may be used to reduce the amount of email churn and logistics involved in establishing communications between and among a group of users that are interested in an event. A benefit that may be realized through the creation of smart communication groups is that there is a reduction in the amount of extraneous or unneeded communications on the communications network, and that relevant events are directly surfaced to users and those users are connected together without the use of manual communications through intermediaries.

In various embodiments, the system relies on asset information in the form of tracking data, as well as user interaction data that is collected in association with an asset-centric feed. Hypothetical users X and Y might both follow an item A, and then a chat thread around asset A may be automatically established between users X and Y to allow for them both to see the status of events and communications in relation to asset A.

Figure 5:
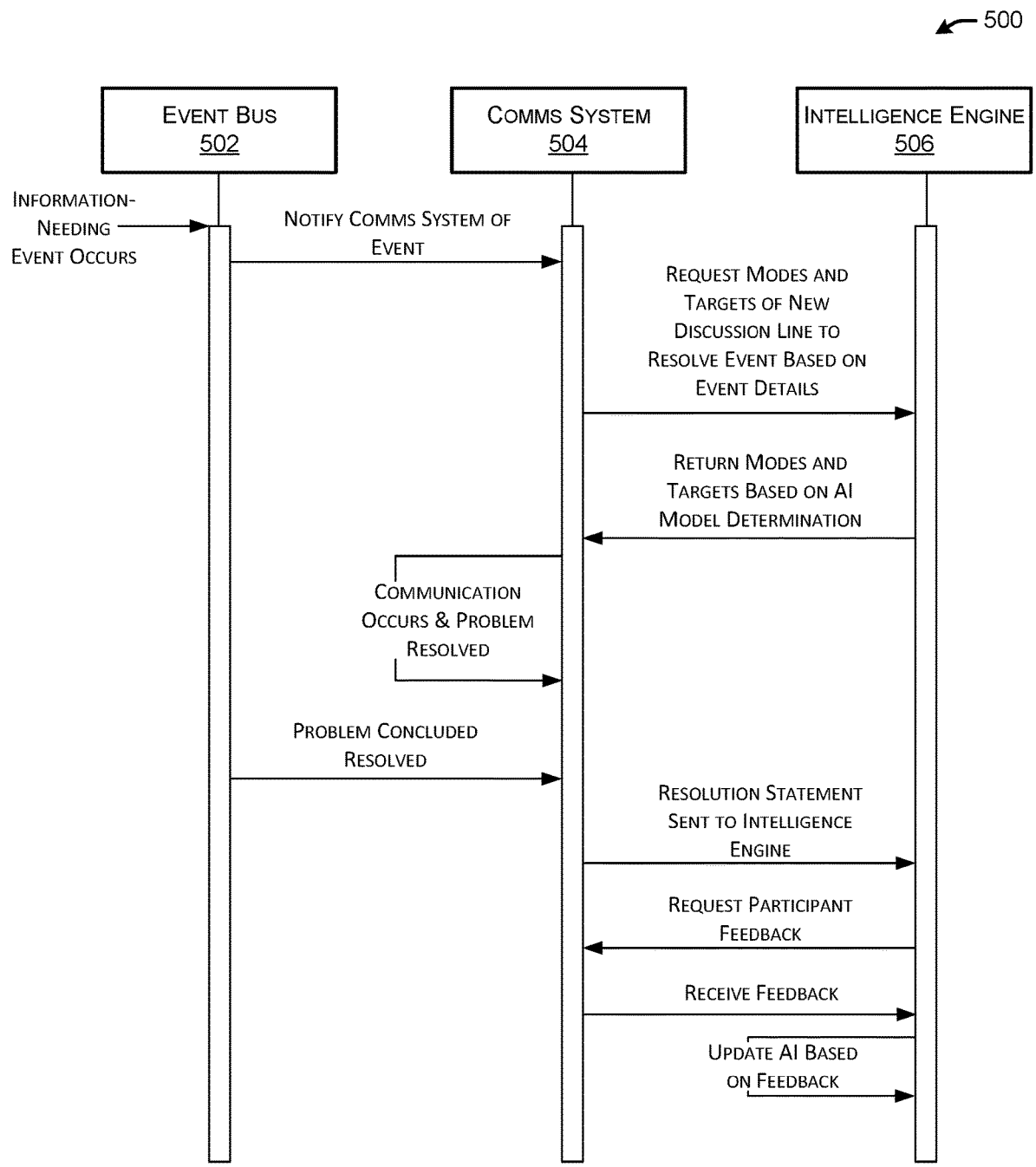
FIG. 5 illustrates an example diagram in which smart communications groups are determined using an artificial intelligence inferencing model, in accordance with one or more embodiments of the present disclosure.

FIG. 5 illustrates an example diagram 500 in which smart communications groups are determined using an artificial intelligence inferencing model, in accordance with one or more embodiments of the present disclosure. In at least one embodiment, an event bus 502 refers to hardware, software, or a combination thereof that receives information needing events. The event bus 502 may receive data ingested from tracking devices, such as Internet-of-Things (JOT) devices, including but not limited to geolocation data, temperature data, time data, and so forth. In various embodiments, data ingested may include external data to the sensors, such as weather, traffic, trucking data, etc. regarding the environment surrounding an asset being monitored by a tracking device. An information-needing event may refer to a type of adverse or otherwise anomalous event that may be considered relevant or important to surface to individuals. Information-needing events may be defined in a system in any suitable manner. For example, if a temperature-sensitive asset reaches or is trending towards reaching an unacceptable temperature, it may be considered an information-needing event.

External data may be used to determine whether an information-needing event occurs. For example, traffic data or weather data may be used in conjunction with asset tracking data to predict whether an adverse event is expected to occur or the probability of an adverse event occurring. For example, if an asset is in transit to a destination, the amount of coolant available for keeping the temperature of the asset in an acceptable range may be one factor in determining a probability of spoilage, but external factors such as weather and traffic may also be important factors for determining whether the amount of coolant is likely to be exhausted prior to reaching the destination.

In various embodiments, communications system (comms system 504) refers to hardware, software, or a combination thereof that receives a notification from event bus 502 of an information-needing event. The notification may reference a specific asset (e.g., by a unique asset identifier) and provide state information regarding the asset and the nature of the information-needing event. The communications system may then submit a request to intelligence engine 506 for modes and targets of new discussion line to resolve event based on the event details. In various embodiments, intelligence engine is implemented as an artificial intelligence (AI) or machine-learning (ML) model that is trained to determine trends and patterns that may arise between different types of assets, different states, and infer a group of targets for which the information-needing event is relevant. The model may be trained on historical event data associated with previous assets and historical user interactions around such assets. When an information-needing event occurs around an asset, the real-time event data for the asset may be used to infer a group of two or more users that would be expected to interact with the asset and based on historical user interactions with historical assets that were in a similar state. For example, a warehouse manager may typically monitor the status of assets at a warehouse that are subject to an adverse event—for example, a temperature-sensitive asset exceeding the allowed temperature specification. The warehouse manager and any other users that are typically involved in the resolution of such an event may be determined to be target users by the intelligence engine 506.

Intelligence engine 506 may determine appropriate modes for communications with respective target users. Different communication modes may be preferred by different users. For example, different modes of communication may include the use of a mobile application feed or messaging system, text messages, email, or other suitable forms of communication. The intelligence engine 506 may use historical user interaction to determine a preferred mode of communication based on the state of the information-needing event.

Intelligence engine 506 may return modes and targets based on AI model determination, as described above. In various embodiments, the communication systems programmatically creates a smart communications group with the target users and using the preferred modes of communication. In various embodiments, the target users receive notifications that the smart communications group has been created around a particular asset associated with the information-needing event, and the users are able to communicate directly with each other to determining how to resolve a problem, if needed. In various embodiments, the real-time tracking data collected surrounding the asset may be used to determine that the problem has been successfully resolved. For example, tracking data regarding a temperature-sensitive asset may indicate that a temperature excursion has been mitigated and the event bus 502 may relay this information to the communications system 504. The smart communications group may be notified of the resolution in relation to the asset. The resolution statement may be sent by the comms system 504 to intelligence engine 506.

In some embodiments, feedback is requested by the intelligence engine 506 upon resolution of a problem. Feedback may be sent to a target user to request whether the user should have been added to the smart group by intelligence engine 506, whether other users that were added should have been added, whether there were any users that should have been added but were not added, and so forth. In some embodiments, feedback is implicitly identified by targeted users leaving the communications group, or by the addition of more users that were not initially identified as target users by the intelligence engine 506.

In various embodiments, feedback may be sent by users via the comms system to intelligence engine 506 and may be used by the AI model to update parameters and further refine how targets are identified.

Figure 6:
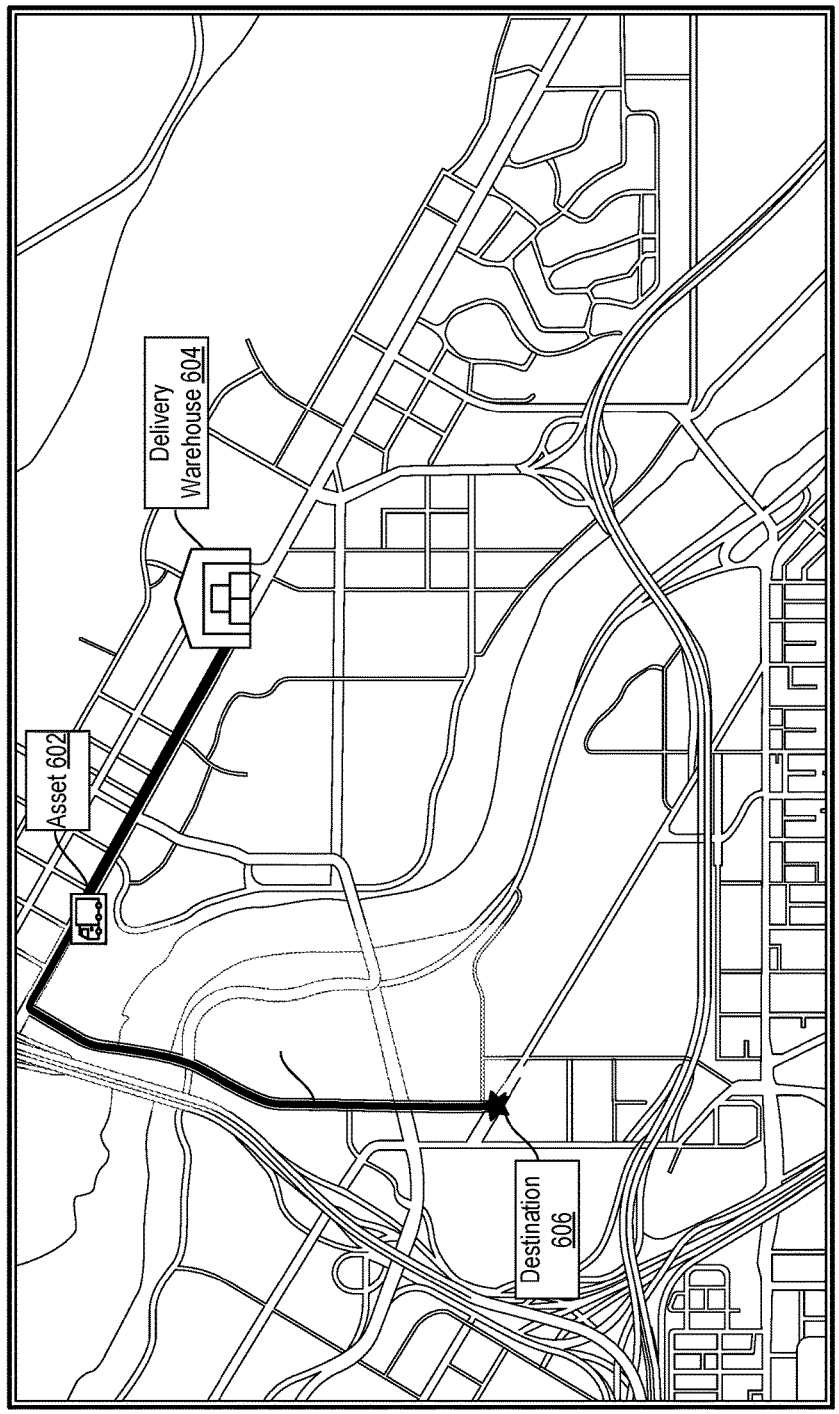
FIG. 6 illustrates an example environment in which smart communications groups may be established using asset flows, in accordance with one or more embodiments of the present disclosure.
Figure 6:
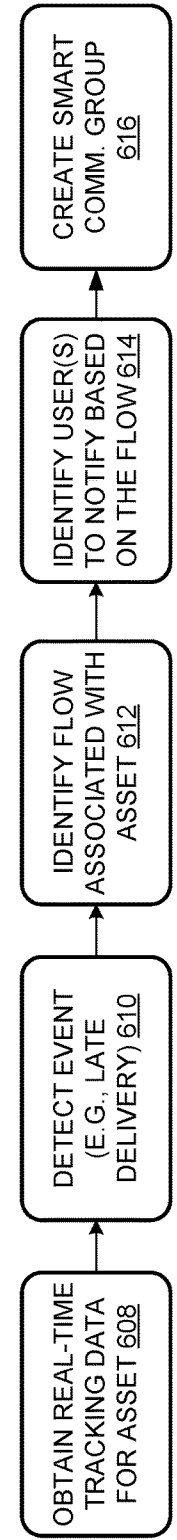

FIG. 6 illustrates an example environment 600 in which smart communications groups may be established using asset flows, in accordance with one or more embodiments of the present disclosure.

In various embodiments, a flow-centric smart communications group may be established that uses information regarding the expected flow of an asset through a supply chain environment to identify target users to include in a smart communications group. Asset 602 may refer to any suitable asset as described herein, and may, for example, be in transit from a warehouse 604 to a destination 606. At step 608, real-time tracking data for the asset may be obtained. A tracking device may be used to determine sensor data that is transmitted to a server where an event ingestion service receives event data from the tracking device, processes, it, and stores it.

The real-time event data may be used at step 610 to detect an event. An event may be an adverse event, such as a late or delayed delivery, or may be an expected event, such as an on-time delivery occurring. For illustrative purposes, FIG. 6 may depict a scenario in which unexpectedly bad traffic results in the estimated delivery time of an asset being delayed beyond an expected delivery window. The delayed or late delivery event may be used to trigger the creation of a flow-centric communications group to inform one or more users of the event.

In various embodiment, step 612 involves the identification of a flow associated with the asset 602. Flows may refer to operating procedures or rules that are defined in association with an asset. For example, a flow associated with asset 602 may be that the asset should be received at destination 606 by a warehouse worker, signed for, and immediately placed in a temperature-controlled storage unit. The flow may be defined for a class of assets or may be standard procedures that are defined across an organization for an asset based on its value or other criteria. An asset-related flow may define one or more upstream users and one or more downstream users. For example, upstream users for asset 602 as it is in transmit may include the manager of warehouse 604 who was responsible for ensuring the coordination of the delivery of asset 602 to destination 606. Downstream users may refer, for example, to the manager or other users at destination 606 that are in charge of receiving, at some point in the future, asset 602 when it arrives at destination 606.

At step 614, one or more users to be notified may be identified based on the associated flow and the detected event. For example, in the case of a delayed event, one or more downstream users may be notified. For example, a manager at destination 606 may be notified of a delayed or late delivery. A set of custom rules may be defined in or in relation to an asset flow. An intelligence engine may be used to identify specific users or types of users that that are likely to be interested in certain types of events at certain points in an asset flow. For example, for delayed deliveries, an intelligence engine may determine that the downstream entity to be contacted includes the warehouse manager or the worker responsible for receiving the delivery.

Once users have been identified (e.g., according to an applicable flow), a communications system may perform step 616 to create a smart communications group. In some embodiments, a notification is generated in association with the event or flow. For example, in some cases, a flow may indicate that only a single user should be notified, in which case a notification may be sent to the user in lieu of creating a smart group. For example, if only the receiving dock worker is to be notified of a late delivery, the notification may be sent to the user, as there is not any further communications required at that time. When a smart communications group is created around an asset, users may communicate, add more users to the group, leave the group, and so forth. The smart communications group may be used to inform the relevant parties in a flow to ensure that an unloading bay is available for the new, later, delivery time, that a temperature-controlled storage unit is not expected to be full at the updated delivery time, and so forth.

Figure 7:
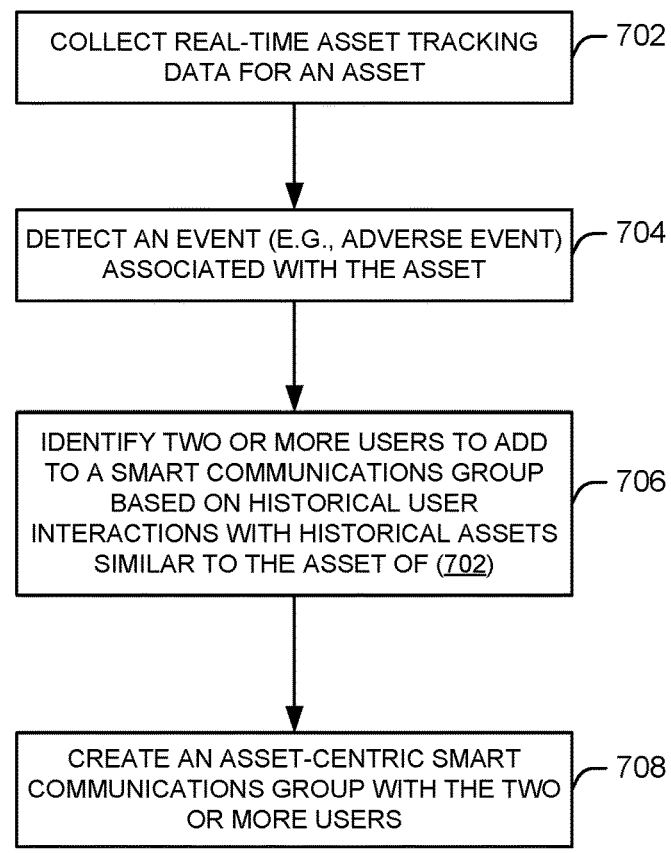
FIG. 7 shows an illustrative example of process for creating asset-centric smart communication groups, in accordance with one or more example embodiments of the present disclosure.

FIG. 7 shows an illustrative example of process 700 for creating asset-centric smart communication groups, in accordance with one or more example embodiments of the present disclosure. In at least one embodiment, some or all of the process 700 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 700 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 700 may be implemented in the context of various systems and methods described elsewhere in this disclosure, such as those discussed in connection with FIGS. 1-8. In at least one embodiment, process 700 or a portion thereof is implemented by one or more computer systems that manage a supply chain network. Process 700 may be implemented at least in part using any suitable system, such as those described in connection with FIG. 8.

In at least one embodiment, process 700 comprises a step 702 to collect real-time asset tracking data for an asset. In various embodiments, a tracking device attached to an asset collects sensor data that is transmitted across a wireless communications network to a data ingestion service that receives the real-time asset tracking data and processes it.

In at least one embodiment, process 700 comprises a step 704 to detect an event (e.g., adverse event) associated with the asset. In various embodiments, an information-needing event is detected. Real-time event data may be analyzed to detect when an information-needing event occurs for an asset. An information-needing event may refer to an abnormal event that occurs, such as a temperature excursion for a temperature-sensitive asset, such as medical supplies, produce, and so forth. In some cases, information-needing events are not abnormal or unexpected events, but rather expected events. In some embodiments, an information-needing event may occur when, for example, custody of an asset is handed off from one party to another. For example, a first organization may be tasked with delivering an asset to a second organization at a location and an information-needing event may occur to notify an agent of the second organization to receive custody of the asset when it arrives In at least one embodiment, process 700 comprises a step 706 to identify two or more users to add to a smart communications group based on historical user interactions with historical assets similar to the asset referenced in step 702. An intelligence engine may be trained on historical user interactions and historical event data to identify relevant users for the detected event. In various embodiments, the current, real-time state of an asset is determined and an intelligence engine determines a list of users that interacted with similar assets in similar states in the historical data.

An intelligence engine may be used to identify users for whom an event is relevant towards. An intelligence engine may comprise a machine-learning (ML) model that analyzes historical user interactions for historical assets that have moved through a supply chain that are similar to the asset that is being monitored in real-time. For example, similarities may include the size, value, or type of payload included in the asset. Similarities may include locations or paths being taken by assets through a supply chain. Similarities may include types of adverse conditions that may occur, such as temperature excursions for temperature-sensitive assets. When similar conditions are detected, an intelligence engine may determine target users that may be interested in being notified of the information-needing event associated with the asset in real-time. Historical user interaction data may be used to determine specific users or types of users that should be identified as target users for a smart communications group. For example, if hypothetical users A, B, and C have subscribed to notifications for previous similar assets under similar conditions, then intelligence engine may infer that those users should be grouped together when a real-time event signal indicates that a similar asset is presently experiencing similar conditions. Intelligence engine may identify a set of target users based on their historical user interactions with similar assets, and provide the users to communications system.

In at least one embodiment, process 700 comprises a step 708 to create an asset-centric smart communications group with the two or more users. In various embodiments, target users are identified based on their historical user interactions with similar assets. For example, if hypothetical users X, Y, and Z typically tag an asset when a specific condition C occurs, then the occurrence of such event to an asset in real-time may cause an intelligence engine to identify users X, Y, and Z as target users and create a smart communications group for the users surrounding the asset as the event occurs in real-time. The smart communications group may be utilized by the targeted users to seek additional information regarding the asset, invite additional users if more information is needed, and so forth.

It is understood that the above descriptions are for purposes of illustration and are not meant to be limiting.

Figure 8:
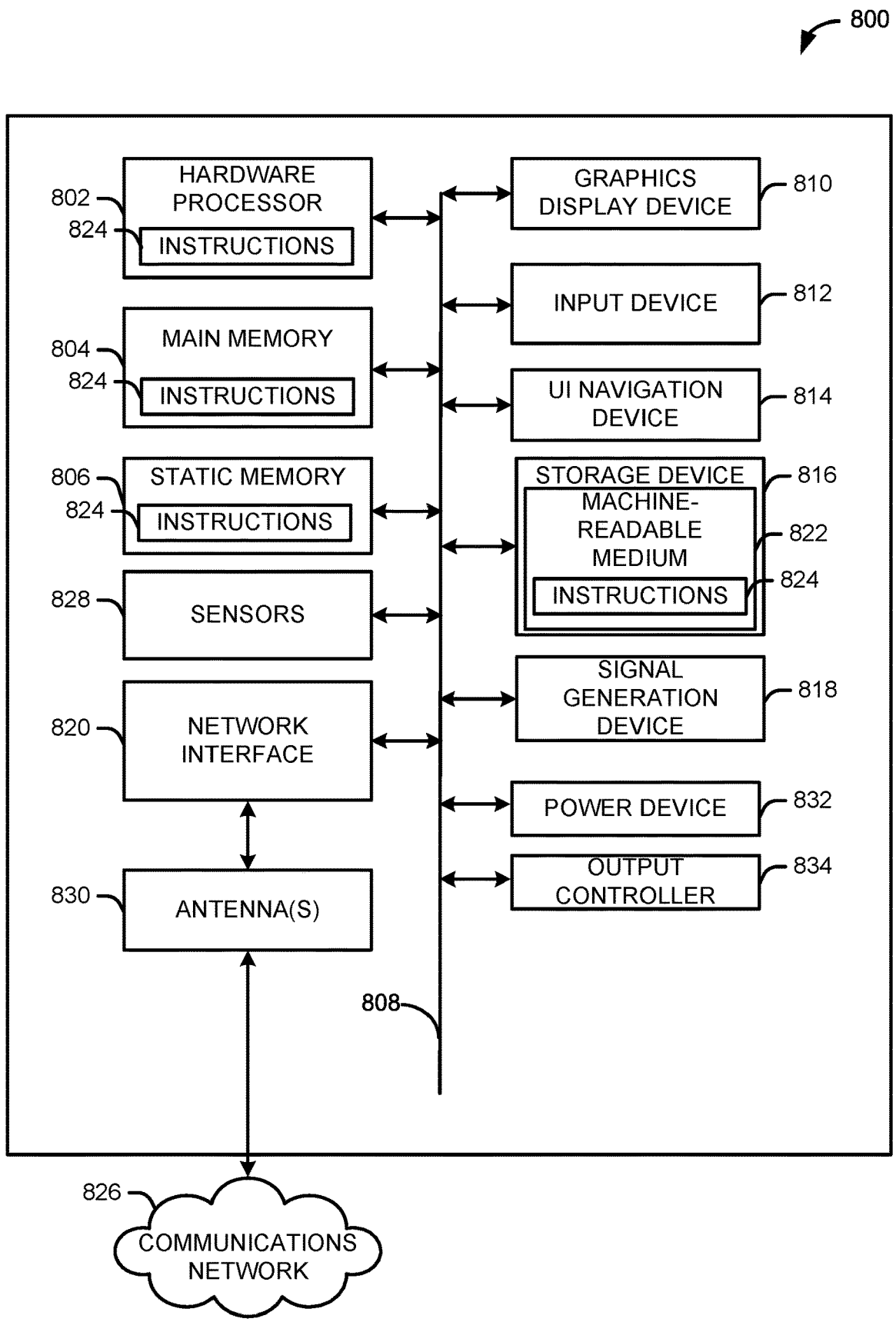
FIG. 8 illustrates a block diagram of an example machine upon which any of one or more techniques (e.g., methods) may be performed, in accordance with one or more example embodiments of the present disclosure.

Various techniques described above in connection with FIGS. 1-7 may be implemented in the context of a hardware device, such as machine 800 described in accordance with FIG. 8.

FIG. 8 illustrates a block diagram of an example of a machine 800 or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. The machine 800 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include any combination of the illustrated components. For example, the machine 800 may include a hardware processor 802 (e.g., a central processing unit (CPU), a graphics processing unit (GPU), a tensor processing unit (TPU) including an artificial intelligence application-specific integrated circuit (ASIC), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818 (e.g., a data signal), a network interface device/transceiver 820 coupled to antenna(s) 830, and one or more sensors 828, such as a sound detecting sensor (e.g., a microphone), accelerometers, magnetometers, location sensors, and the like. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include DOCSIS, fiber optic, a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cable box, a wearable smart device, cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a wearable smart device, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, DOCSIS, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method, comprising:
obtaining sensor data collected from a tracking device associated with an asset;
determining, based at least in part on the sensor data, that an adverse event occurred in connection with the asset;
providing an indication of the adverse event to a communications system;
submitting, by the communications system, a request to an intelligence engine to determine target users for the adverse event;
identifying, by a machine-learning (ML) model of the intelligence engine and based at least in part on the sensor data, a user of the communications system, wherein the ML model is used to determine that the adverse event is relevant to the user;
establishing, by the communications system, a smart communications group associated with the asset, wherein the smart communications group comprises two or more users comprising the user;
determining, by the communications system, user interactions between the two or more users of the smart communications group;

obtaining additional sensor data collected from the tracking device associated with the asset;
determining, based at least in part on the additional sensor data, resolution of the adverse event; and
updating the ML model based at least in part on the user interactions.

2. The method of claim 1, further comprising:
obtaining historical user interaction data;
obtaining historical event data; and
training the (ML) model based at least in part on the historical user interaction data and the historical event data.

3. The method of claim 2, wherein:
the identification of the user is based at least in part on determining co-occurrences of the historical user interaction data with the historical event data similar to the adverse event.

4. The method of claim 1, wherein the user interactions comprise the user manually adding an additional user to the smart communications group.

5. The method of claim 1, wherein the user interactions comprise the user manually leaving the smart communications group.

6. The method of claim 1, further comprising:
determining a first preferred mode of communication for the user;
determining a second preferred mode of communication for a second user of the two or more users; and
establishing the smart communications group using the first preferred mode of communication for the user and the second preferred mode of communication for the second user.

7. The method of claim 1, further comprising:
providing, to the smart communications group, an indication of the adverse event associated with the asset.

8. The method of claim 1, further comprising:
training the ML model to predict whether users are likely to perform respective user interactions based at least in part on asset states.

9. The method of claim 8, wherein the training is based at least in part on user interaction data and event data, and wherein the training comprises training the ML model to identify co-occurrences of the user interaction data the event data to identify whether a respective event is relevant to a respective user.

10. The method of claim 8, wherein the training comprises training the ML model to detect trends and patterns between assets and asset states, and relevance of events to respective users.

11. A system, comprising:
at least one processor; and
at least one memory storing computer-executable instructions, that when executed by the at least one processor, cause the at least one processor to:
obtain sensor data collected from a tracking device associated with an asset;
determine, based at least in part on the sensor data, that an adverse event occurred in connection with the asset;
provide an indication of the adverse event to a communications system;
submit, by the communications system, a request to an intelligence engine to determine target users for the adverse event;
identify, by a machine-learning (ML) model of the intelligence engine and based at least in part on the sensor data, a user of the communications system, wherein the ML model is used to determine that the adverse event is relevant to the user;
establish, by the communications system, a smart communications group associated with the asset, wherein the smart communications group comprises two or more users comprising the user;
determine, by the communications system, user interactions between the two or more users of the smart communications group;
obtain additional sensor data collected from the tracking device associated with the asset;
determine, based at least in part on the additional sensor data, resolution of the adverse event; and
update the ML model based at least in part on the user interactions.

12. The system of claim 11, wherein the two or more users include a second user, and the at least one processor is further configured to:
determine a first preferred mode of communication for the user;
determine a second preferred mode of communication for the second user; and
establish the smart communications group using the first preferred mode of communication for the user and the second preferred mode of communication for the second user.

13. The system of claim 11, wherein the two or more users are downstream users of a flow associated with the asset.

14. The system of claim 11, wherein the instructions further cause the at least one processor to:
train the ML model to predict whether users are likely to perform respective user interactions based at least in part on asset states.

15. The system of claim 14, wherein the training is based at least in part on user interaction data and event data, and wherein the training comprises training the ML model to identify co-occurrences of the user interaction data and the event data to identify whether a respective event is relevant to a respective user.

16. The system of claim 14, wherein the training comprises training the ML model to detect trends and patterns between assets and asset states, and relevance of events to respective users.

17. A non-transitory computer-readable medium including computer-executable instructions stored thereon, which when executed by at least one processor, cause the at least one processor to:
obtain sensor data collected from a tracking device associated with an asset;
determine, based at least in part on the sensor data, that an adverse event occurred in connection with the asset;
provide an indication of the adverse event to a communications system;
submit, by the communications system, a request to an intelligence engine to determine target users for the adverse event;
identify, by a machine-learning (ML) model of the intelligence engine and based at least in part on the sensor data, a user of the communications system, wherein the ML model is used to determine that the adverse event is relevant to the user;
establish, by the communications system, a smart communications group associated with the asset, wherein the smart communications group comprises two or more users comprising the user;

determine, by the communications system, a user interactions between the two or more users of the smart communications group;

obtain additional sensor data collected from the tracking device associated with the asset;

determine, based at least in part on the additional sensor data, resolution of the adverse event; and update the ML model based at least in part on the user interactions.

18. The non-transitory computer-readable medium of claim 17, wherein the two or more users includes a second user, and the instructions further cause the at least one processor to:

determine a first preferred mode of communication for the user;

determine a second preferred mode of communication for the second user; and establish the smart communications group using the first preferred mode of communication for the user and the second preferred mode of communication for the second user.

19. The non-transitory computer-readable medium of claim 17, wherein the two or more users are downstream users of a flow associated with the asset.

20. The non-transitory computer-readable medium of claim 17, wherein the sensor data is collected as real-time event data.

* * * * *